United States Patent
Pokrandt et al.

(12) 
(10) Patent No.: US 6,342,011 B1
(45) Date of Patent: Jan. 29, 2002

(54) FLEXIBLE SHAFT COUPLING WITH IMPROVED ELASTOMERIC ELEMENT

(75) Inventors: Glenn C. Pokrandt, Auburn, AL (US); William F. Busser, Pewaukee, WI (US)

(73) Assignee: The Falk Corporation, Milwaukee, WI (US)

( * ) Notice: Subject to any disclaimer, the term of this patent is extended or adjusted under 35 U.S.C. 154(b) by 0 days.

(21) Appl. No.: 09/285,113

(22) Filed: Apr. 1, 1999

(51) Int. Cl.[7] ................................................. F16D 3/54
(52) U.S. Cl. .......................................... 464/73; 464/88
(58) Field of Search ............................. 464/73, 88, 92, 464/93, 98, 49, 154; 29/525

(56) References Cited

U.S. PATENT DOCUMENTS

| | | | |
|---|---|---|---|
| 1,983,007 A | * 12/1934 | Simons | 464/88 |
| 2,034,001 A | 3/1936 | Ricefield | |
| 2,417,436 A | * 3/1947 | Natkins | 464/73 X |
| 2,588,158 A | 3/1952 | Pierce | |
| 2,655,798 A | 10/1953 | Neher | |
| 2,952,143 A | 9/1960 | Case | |
| 3,057,647 A | * 10/1962 | Wood | 464/88 X |
| 3,205,682 A | 9/1965 | Porter | |
| 3,362,191 A | 1/1968 | Louette | |
| 4,047,395 A | * 9/1977 | Bendall | 464/88 X |
| 4,881,921 A | * 11/1989 | Pokrandt et al. | 464/54 |
| 5,139,460 A | 8/1992 | Hoyt, III et al. | |
| 5,295,911 A | 3/1994 | Hoyt, III et al. | |
| 5,595,541 A | 1/1997 | Ducugnon | |
| 5,908,355 A | * 6/1999 | Hoyt, III et al. | 464/88 |

FOREIGN PATENT DOCUMENTS

| | | | |
|---|---|---|---|
| GB | 717421 | * 10/1954 | 464/73 |
| IT | 462900 | * 7/1951 | 464/73 |

OTHER PUBLICATIONS

Product Brochure entitled: "Elastic Coupler" by ATR Sales, Inc. (1981).
Product Brochure entitled: "Flexible Couplings" by ATR Sales, Inc. (1997).
Product Brochure entitled: "Elastometric Couplings" by Flexibox Inc. (Sep. 1996).

* cited by examiner

Primary Examiner—Lynne H. Browne
Assistant Examiner—Greg Binda
(74) Attorney, Agent, or Firm—James A. Wanner

(57) ABSTRACT

In a flexible coupling generally comprising a driving and a driven hub, each having axially extending teeth, and a slotted cylindrical elastomeric element positioned around the hub teeth so as to transmit torque from a driving hub teeth to the driven hub teeth, the bottom of the slots of the elastomeric element are formed with compound curves so as to reduce stress on the elastomeric element and also provide a relief area for the outer periphery of the hub teeth to prevent engagement of the sharp edges of the hub teeth with the elastomeric element. This provides greater flexibility and improved life for the elastomeric element. Furthermore, the hub teeth are tapered in the axial direction so as to provide for axial insertion of the hub teeth into the elastomeric element and furthermore provide a curved surface on the teeth to reduce the biting effect of the leading edges of the hub teeth on the elastomeric element.

7 Claims, 4 Drawing Sheets

FLEXIBLE SHAFT COUPLING WITH IMPROVED ELASTOMERIC ELEMENT

FIELD OF THE INVENTION

The present invention is directed to a flexible shaft coupling having a cylindrical elastomeric member within internal slots centrally located between a pair of shaft hubs each having teeth axially extending toward the other hub.

BACKGROUND OF THE INVENTION

Flexible couplings are used to transmit power or torque between a driving element, normally a shaft connected to a prime mover, and a driven element, normally a shaft connected to a load. The flexible coupling adjusts for both parallel and angular misalignment of the two shafts. One common form of flexible coupling has a central elastomeric element transmitting the torque between a driving hub and a driven hub. The term "hub" as used herein includes an axially located member directly connected to the driving or driven device, or integral with the shafts of the driving or driven device, or most commonly mounted on the shafts of the driving or driven device by means of keyways so as to transmit torque. Each hub has axially extending teeth which do not directly engage teeth of the other hub but are received in radial slots of a centrally located cylindrical elastomeric element so that the torque is transmitted through the elastomeric element and misalignment can be tolerated. The elastomeric element also, due to its partial compressibility, softens the transmission of torque from one hub to the other upon acceleration or deceleration.

The preferred form of elastomeric element has a radial slit which permits the elastomeric element to be unwrapped from its normal cylindrical shape. The slit allows the elastomeric element to be unwrapped or opened, positioned adjacent to the teeth of the hubs, and then wrapped or closed around the teeth so as to be in direct physical contact and engage the teeth of both hubs to transmit torque. This permits removal of the elastomeric element without requiring movement of the hubs, and more importantly movement of either the prime mover or the load connected by the flexible coupling. In its most common form the elastomeric element is surrounded by an outer sleeve which prevents the cylindrical elastomeric element, when the coupling is in an assembled state, from either unwrapping or expanding outwardly when under load or rotation.

It is important that the elastomeric element transmitting the torque between the hubs, and being in shear under a loaded condition, be designed in a manner which provides sufficient flexibility to permit the unwrapping and wrapping of the elastomeric element and also reduce any tearing of the elastomeric element by the shear force asserted on the elastomeric element when it is transmitting power from the driven hub to the driving hub. It is also important that the slots of the elastomeric element and the hub teeth be designed in a manner to permit full engagement with area contact between the elastomeric element slots and the hub teeth when the elastomeric element is located on the teeth in the assembled condition.

SUMMARY OF THE INVENTION

It is an object of the present invention to increase the life of the elastomeric element of a flexible coupling by having the slot bottom wall substantially tangential to the outer periphery of the elastomeric element. Such provides relatively uniform thickness of the elastomeric element between the bottom wall of the slot and the elastomeric member outer surface. Furthermore, the bottom wall of the slot is joined to the slot side walls by compound curved walls so that there are no sharp corners between the slot bottom wall and the slot side walls with the compound curved walls being located so that the bottom portion of the elastomeric member slots is wider or thicker than the remainder of the slots. Preferably, the radius of the concave wall portion joining the slot bottom wall to the slot side walls is 15%–25% of the width of the slots, 3 to 7 times clearance between the outer periphery of the hub teeth and the bottom wall of the elastomeric element, and 5% to 15% of depth of the elastomeric element slot minus the aforesaid clearance. This form of construction creates greater flexibility of the elastomeric element near the bottom of the slots while reducing stress concentration at the location where the slot side walls joint the slot bottom wall. This furthermore increases the flexibility in the elastomeric element which allows the slot side walls to maintain better area contact with the hub teeth surfaces.

Thus it is an object of the present invention that the elastomeric element slots have a pair of slot side walls and a slot bottom wall and each of the slot side walls being joined to the slot bottom wall by a concave wall with one end of the concave wall being tangential to the slot bottom wall and the other end of the concave wall blending in with the slot side walls. Even more preferably, the concave wall joining the slot bottom wall and side walls is joined to the slot side walls by a second convex wall. In the preferred form of the present invention, the hub teeth outer periphery does not engage the slot bottom wall but is located in the relief area formed by the concave walls near the bottom of the elastomeric element slots. Thus, the sharp peripheral outer edges of the teeth do not engage the elastomeric element even when torque is applied to the flexible coupling, and this also reduces stress on the elastomeric element to further increase its life.

The present invention is also directed to a flexible coupling of the type described wherein the side surface of the hub teeth are tapered or curved toward the free end of the teeth. This taper of large radius creates a smooth outer surface near the free end of each tooth where the teeth first contact the elastomeric element. This reduces the stress on the elastomeric element at the free end of the hub teeth by allowing area contact instead of linear contact when the coupling is placed under load. This results in a reorientation of the pressure distribution from the hub teeth to the elastomeric element slots resulting in more central location for reduced bending stress. This improves the flexible coupling's ability to accommodate both angular and parallel misalignment. Therefore, it is an object of the invention that the hub teeth and the flexible element of the type described have tapered or curved surfaces adjacent to the free end of the teeth.

Although flexible couplings of the type described are generally assembled with both a driving shaft and driven shaft already in place and the central elastomeric element wrapped around the hub teeth, it is sometimes desirable that the flexible coupling is assembled by axially moving one hub toward the other hub with the hub teeth entering and engaging the slots of the elastomeric element without requiring that the elastomeric element be unwrapped. Therefore, it is an object of the present invention that the hub teeth of the coupling have tapered or curved surfaces near the free end of the hub teeth permitting the flexible coupling to be assembled by locating the first and second hubs on the coupling axis with the elastomeric element being located on the teeth of one of the hubs and axially inserting the teeth of the second hub by relative axial movement of the second hub relative to the first hub.

DETAILED DESCRIPTION OF THE PREFERRED EMBODIMENT

Figure 1:
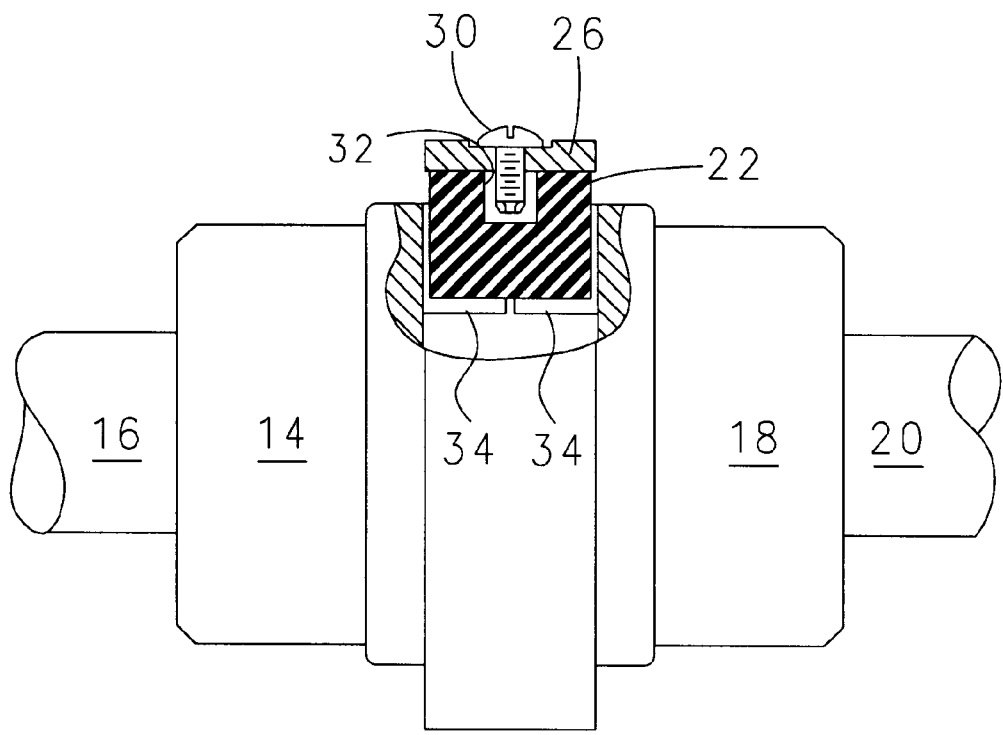
FIG. 1 is a side view, partly in section, of the assembled flexible coupling of the present invention.
Figure 2:
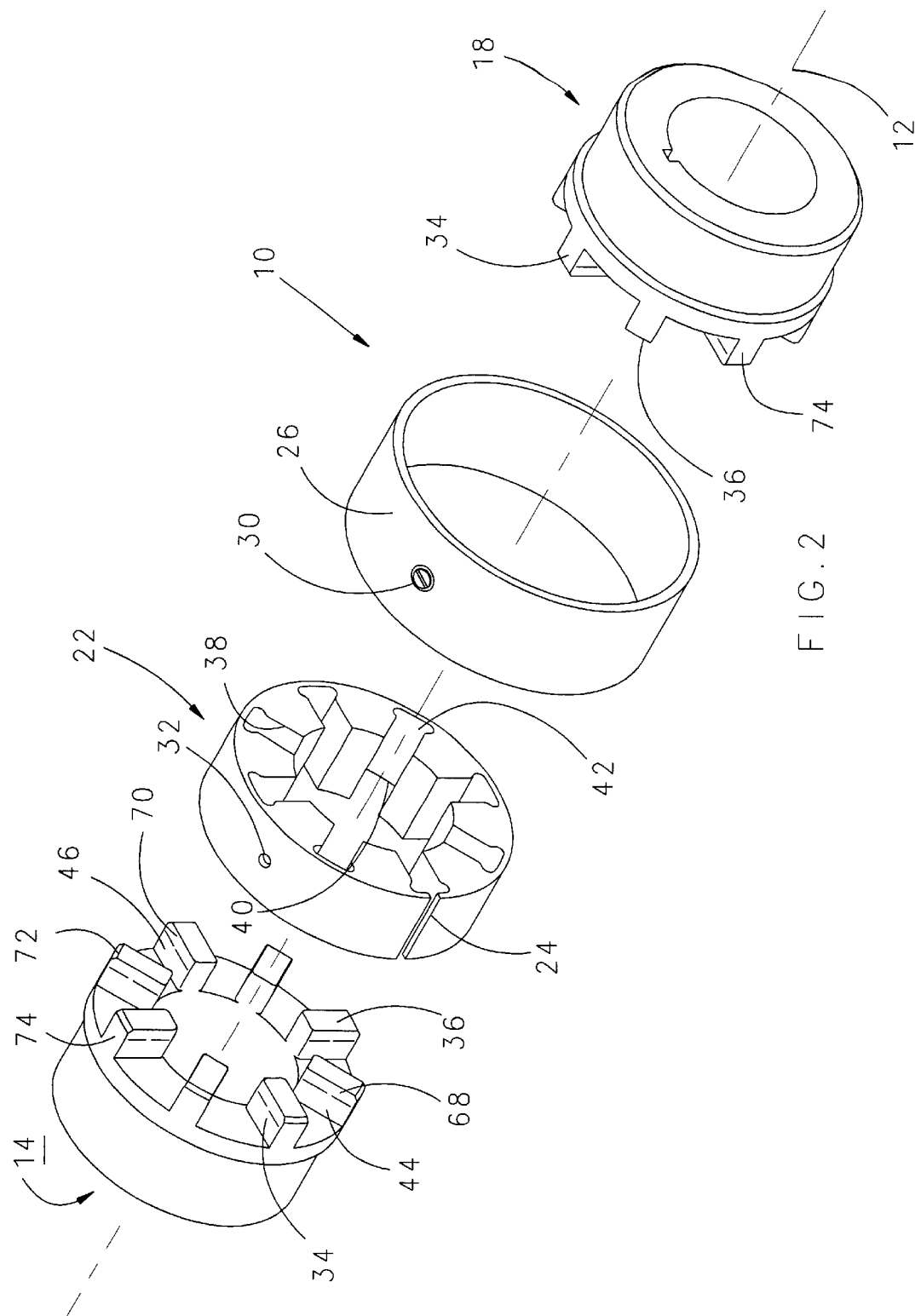
FIG. 2 is an exploded view showing the elements of the flexible coupling of the present invention located about the coupling axis.

The flexible coupling 10 of the present invention is shown in the assembled form in FIG. 1 and the exploded view form in FIG. 2. The flexible coupling 10 has a plurality of elements centered about a coupling axis 12 comprising a first hub 14 located on a first or driving shaft 16 and a second hub 18 mounted on a second or driven shaft 20 with the hubs 14, 18 connected by a flexible element 22. The flexible element 22 includes a radial slit 24 which permits the elastomeric element 22 to be unwrapped or opened and then wrapped around teeth on the hubs 14, 18. An outer sleeve 26 is used to prevent radial expansion or unwrapping of the elastomeric element 22 when the coupling is under load and from rotation. One method for locating the outer sleeve 26 is a button head screw 30 which can be threadedly located on the sleeve 26 with the inner end of the screw entering into a hole 32 of the flexible element 22. This keeps the outer sleeve 24 axially located relative to the elastomeric element 22.

As can be seen in FIG. 2, each of the hubs 14, 18 have teeth 34 which axially extend in the direction toward the other hub. Each of the hub teeth have a free end 36, and when the flexible coupling is in final assembled condition as shown in FIG. 1, the teeth 34 of the two hubs 14, 18 do not overlap or engage and the free ends 36 of the teeth 34 of hub 14 are axially spaced from the free ends 36 of the teeth 34 of hub 18.

The cylindrical elastomeric member 22 has a plurality of axially extending slots 38, eight in the example shown, with each slot 38 having a first slot end 40 located in the proximity of the teeth 34 of first hub 14 and a second slot end 42 located in the proximity of the teeth 34 of the second or driven hub 18. The first slot end 40 of the eight slots 38 engage the side surfaces 44, 46 of the teeth of the first hub 14. Similarly, the second end 42 of the eight slots 38 of the elastomeric element 22 engage the side surfaces (not shown but similar to those shown on hub 14) of the second or driven hub 34. Therefore, all torque between the driving hub 14 and the driven hub 18 is transmitted through the elastomeric member 22 with the elastomeric member 22 being in shear in the area between free end 36 of the hub teeth 34 on the pair of hubs 14, 18.

In the improved flexible coupling of the present invention it is desired to maintain surface contact to the greatest degree possible between the side walls of the slots 38 and the hub teeth side surfaces 44, 46. The hub teeth 34 are tapered near the free end 36 of each tooth and the radially outward portion or bottom of each slot 38 is specially designed to provide greater flexibility while reducing wear and stress on the flexible element 22. Each of these features will now be explained in greater detail.

Figure 3A:
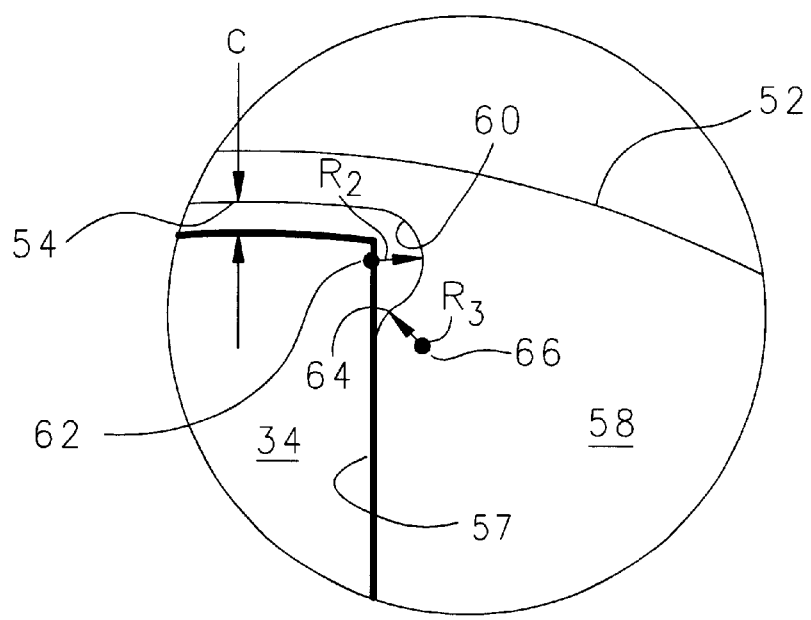
FIG. 3A is an enlarged view of a portion of the end of the elastomeric element taken from the dotted portion of FIG. 3 showing the radiuses joining the slot side walls and bottom wall.
Figure 3:
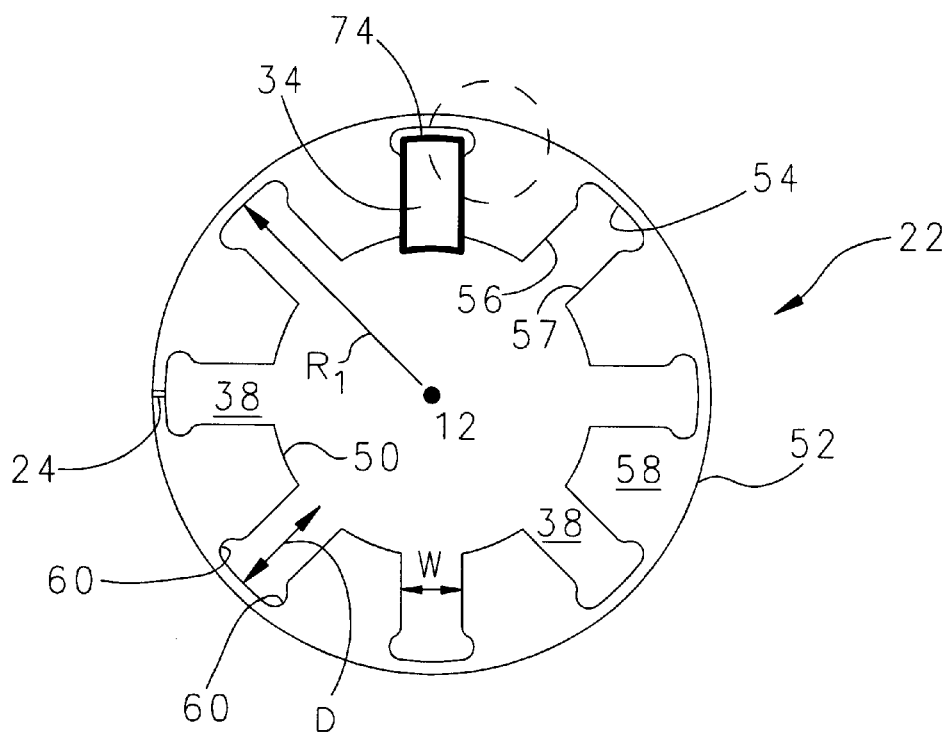
FIG. 3 is an end view of the elastomeric member showing the slot side walls and bottom wall.

FIG. 3 shows an end view of the flexible element 22 with the eight slots 38. The slots 38 are open to the interior of the elastomeric element 22 and thus are open to the inner cylindrical wall 50 of the elastomeric element 22. The element 22 also has an outer peripheral cylindrical wall 52. The radially outward portion of each slot 38 has a bottom wall 54 which is formed by a radius $R_1$ centered from the coupling central axis 12. Each slot furthermore has a pair of slot side walls 56, 57 and it is these slot side walls 56, 57 that engage the side surfaces 44, 46 of the teeth 34 of each hub 14, 18. The elastic material of the elastomeric element 22 between adjacent slots 38 form teeth like formations 58. It is these teeth formations 58 that carry the torque load between the two hubs and which are in shear when a load is transmitted by the flexible coupling 10.

Because the bottom wall 54 of the slots 38 are formed about the central axes 12, and obviously the outer cylindrical wall 52 of the elastomeric element 22 is also formed about the central axis 12, the elastomeric portion between the bottom walls 54 and the outer surface 52 tend to be of uniform thickness and flexible which permits the opening of the elastomeric element at the slit 24 to permit wrapping of the elastomeric element 22 about the teeth 34 of the hubs 14, 18.

Prior art constructions of the elastomeric element 22 had sharp corners between the slot side walls 56, 57 and the bottom wall 54 of the slots 38. This reduces the life of the element 22 due to potential tearing action at the junction of the bottom wall and the side walls. As seen in FIG. 3 and enlarged FIG. 3A, the bottom wall 54 of the present invention is joined to each of the side walls by a concave curved wall 60 where the end of the concave wall 60 closest to the bottom wall 54 tangentially mergering into the bottom wall 54. This is done by locating the axis 62 of the concave wall 60 parallel to the central axis 12 and generally in the plane of slot side walls 56, 57 and with the radius $R_2$ of the concave wall 60 being of such dimension so as to provide the tangential merge. Ideally the other end of the concave wall 60 merges with the slots side walls, 56, 57 by means of a second convex curved wall 64 formed with the radius $R_3$ around a axis 66 which is also parallel to the central axis 12 and the first radial wall axis 62. The curved walls 60 and 64 combined to form a compound curve joining the slot bottom wall 54 and the slot side walls 56, 57 so that no sharp edges occur. The slot side walls 56, 57 are parallel to each other and also are adapted to be parallel to the side surfaces of the hub teeth 34.

Ideally, the radius $R_2$ and the radius $R_3$ are approximately 15% to 25% of the width W of the slot 38 between slot side wall 56 and slot side wall 57, with $R_3$ being 110% to 135% $R_2$. This results in a relief area at the bottom of the slot 38 with the concave walls 60 being wider than the width W of the remainder of the slot between the side walls 56 and 57. The outer peripheral surface 74 of the hub teeth 34 normally are of such dimension so as to not touch the bottom wall 54 of the slots 38 with the gap between the outer tooth surface 74 and the slot bottom wall 54 being clearance C (shown exaggerated in FIG. 3A). However, the outer corners of the hub teeth 34 are located in the relief portion of the slots 38 formed by the concave walls 60 on each side of the slot 38.

Thus, the corners of the teeth do not engage the elastomeric element 22 and even when torque is applied to the coupling 10 the outer peripheral edges of the teeth 34 are still within the void formed by the concave wall 60. Thus the hub teeth 34 do not bite into the material forming the elastomeric element 22 which further reduces stress on the elastomeric element 22 to increase life. In addition to the $R_2$ ratios provided above, experience has shown that the radius $R_2$ should be approximately 3 times to 7 times the dimension of clearance C. This provides adequate relief in the area of concave surface 60 to prevent the edges of teeth 34 from engaging the elastomeric material walls. Also with the slot 38 having a depth D, that is the dimension between the inner cylindrical wall 50 and the slot bottom wall 54, it is preferred that $R_2$ be 5% to 15% of the depth D minus clearance C.

Because of the compound curve formed by the concave wall 60 and convex wall 64, there is less stress at the joint between the slot side walls 56, 57 and the slot bottom wall 54. Furthermore, the compound curve permits greater flexibility in the axial direction permitting the slot side walls 56, 57 to more fully engage the side surfaces 44 and 46 of the hub teeth 34 which provides for area contact between the abutting surfaces to more uniformly distribute the load between the hub teeth 34 and the elastomeric element 22 teeth sections 58. Also the compound curve increases flexibility, with less stress, when unwrapping the elastomeric element 22 for placement on the hubs 34.

Figure 4:
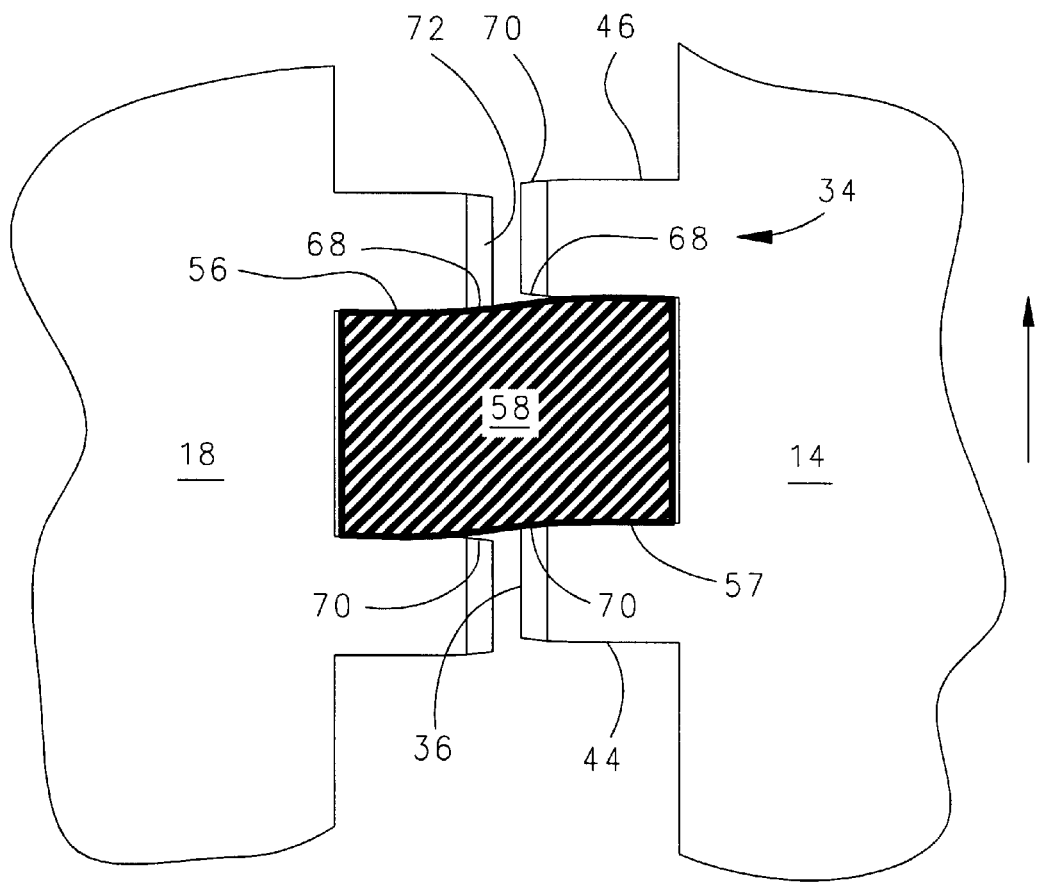
FIG. 4 is a partial section view of the hub teeth of the present invention showing the tapered or curved free end surfaces and their engagement with a portion of the elastomeric element.

Another aspect of the present invention is to have tapered hub teeth 34. As seen in both FIG. 2 and FIG. 4, the side surfaces 44, 46 of the hub teeth 34 have a tapered surface 68, 70 respectively. The tapered surfaces 68, 70 ideally are curved along the outer 20% to 40% of the teeth 34 resulting in a narrowest portion of the teeth 34 being adjacent the tooth free ends 36. The outer edge of each tooth 34 can also be provided with a chamfer 72 adjacent to the tooth free end 36.

The tapered or curved surfaces 68, 70 provide several advantages to the flexible coupling 10. Furthermore blind assembly is improved because the teeth 34 are narrower at the free end 36 then they are at the main cross section of the teeth 34. Although this type of flexible coupling is normally engaged by opening the elastomeric element 22 at the slit 24 and wrapping the element 22 around the hub teeth 34, sometimes it is desirable to axially insert one hub 14 or 18 into the elastomeric element 22 which is already positioned about the teeth 34 of the other hub. Since generally the hubs 14, 18 are made of steel, and the elastomeric element 22 is made of elastomeric, there is considerable friction between the parallel slot side walls 56 and 57 and the parallel side surfaces 44, 46 of the hub teeth 34. By tapering the outer ends of the teeth 34 near the free end 36, the friction is reduced upon axial insertion of the teeth 34 into the slots 38 and blind assembly self alignment is made easier.

Even more importantly, the tapered or curved sections 68, 70 permit greater side surface contact of the teeth 34 with the side walls 56, 57 of the tooth sections 58 of the flexible element 22. As can best be seen in FIG. 4 with the flexible coupling under load, the curved section 70 of the two side wall hub 14 first engages the slot side wall 57 in a smooth manner at the curved section 70, rather than having the tooth tip bite into the tooth section 58 of the flexible element 22. The tooth section 58 then transmits the torque to the hub 18 with the side wall 56 transmitted as torque to the hub 18 engaging the tooth side surface 56 at least in part along the tapered or curved surface 68, again reducing the effect of the tooth end biting into the tooth section 58. This increases the life of the flexible element 22 while also permitting greater area contact between the side surface of the teeth 34 and the tooth sections of the element 22. Also, because of the curved portions 68, 70 of the teeth 34, the tooth section 58 of the elastomeric element 22 engage a greater surface area of the teeth 34.

The foregoing detailed description is provided in sufficient detail to enable one of ordinary skill in the art to make and use the improved features of the flexible coupling. The foregoing detailed description is primarily illustrative of several physical embodiments, and other physical variations not fully described in the specification are encompassed within the purview of the claims. Accordingly, the narrow description of the elements should be used for general guidance rather than to unduly restrict the broad description of the elements in the following claims.

We claim:

1. A flexible coupling having first and second axially spaced hubs each located for rotation about a coupling axis, each of said hubs having teeth with the teeth of said first hub axially extending toward the teeth of said second hub with the free end of said teeth of said first hub being axially spaced from the free end of said teeth of said second hub, and said coupling also having a centrally located cylindrical elastomeric element having axially extending slots into which the teeth of the first and second hub elements axially extend when the coupling is in assembled condition; the improvement comprising:

each of said elastomeric element slots has a pair of slot side walls and also has a slot bottom wall which is the portion of the slot located nearest the outer periphery of said elastomeric element, each of said slot side walls being joined to said slot bottom wall by a concave wall with one end of said concave wall being tangential to said slot bottom wall and the other end of said concave wall blending with said slot side surface; and the teeth of said hub elements having tapered surfaces near the free end of said teeth which engages said slot side walls.

2. The flexible coupling of claim 1 wherein said concave walls form a relief area and the outer peripheral edge of the hub teeth is located within said relief area.

3. A flexible coupling having first and second axially spaced hubs each located for rotation about a coupling axis, each hub having axially extending teeth, and said coupling also having a centrally located cylindrical elastomeric element having axially extending slots into which said teeth of the first and second hub elements axially extend when the coupling is in assembled condition; the improvement comprising:

each of said elastomeric element slots has a pair of slot side walls and also has a slot bottom wall which is the portion of the slot located nearest the outer periphery of said elastomeric element, each of said slot side walls being joined to said slot bottom wall by a concave wall with one end of said concave wall being tangential to said slot bottom wall and the other end of said concave wall blending with said slot side surface, wherein said concave wall form a relief area and the outer peripheral corner of the hub teeth are located at said relief area and wherein there is a clearance between the outer periphery of said hub teeth and said slot bottom wall, and the radius defining said concave wall is 3 to 7 times said clearance.

4. The flexible coupling of claim 3 wherein said radius defining said concave wall is 5% to 15% of the depth of said slot minus said clearance.

5. A flexible coupling having first and second axially spaced hubs each located for rotation about a coupling axis, each hub having axially extending teeth, and said coupling also having a centrally located cylindrical elastomeric element having axially extending slots into which said teeth of the first and second hub elements axially extend when the coupling is in assembled condition; the improvement comprising:

each of said elastomeric element slots has a pair of slot side walls and also has a slot bottom wall which is the portion of the slot located nearest the outer periphery of said elastomeric element, each of said slot side walls being joined to said slot bottom wall by a concave wall with one end of said concave wall being tangential to said slot bottom wall and the other end of said concave wall blending with said slot side surface, wherein the radius defining said concave wall is 15% to 25% of the width of said slot.

6. A flexible coupling having first and second axially spaced hubs each located for rotation about a coupling axis, each hub having axially extending teeth, and said coupling also having a centrally located cylindrical elastomeric element having axially extending slots into which said teeth of the first and second hub elements axially extend when the coupling is in assembled condition; the improvement comprising:

each of said elastomeric element slots has a pair of slot side walls and also has a slot bottom wall which is the portion of the slot located nearest the outer periphery of said elastomeric element, each of said slot side walls being joined to said slot bottom wall by a concave wall with one end of said concave wall being tangential to said slot bottom wall and the other end of said concave wall blending with said slot side surface, wherein the other end of said concave wall is joined said to said slot side surface by a convex wall.

7. The flexible coupling of claim 6 wherein the radius defining said convex wall is 15% to 25% of the width of said slot.

* * * * *